No. 728,561. PATENTED MAY 19, 1903.
L. FRANZMEIER.
HARVESTER ATTACHMENT.
APPLICATION FILED NOV. 12, 1902.
NO MODEL.
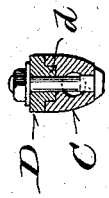
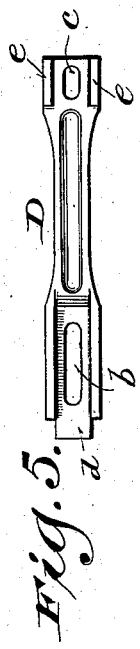
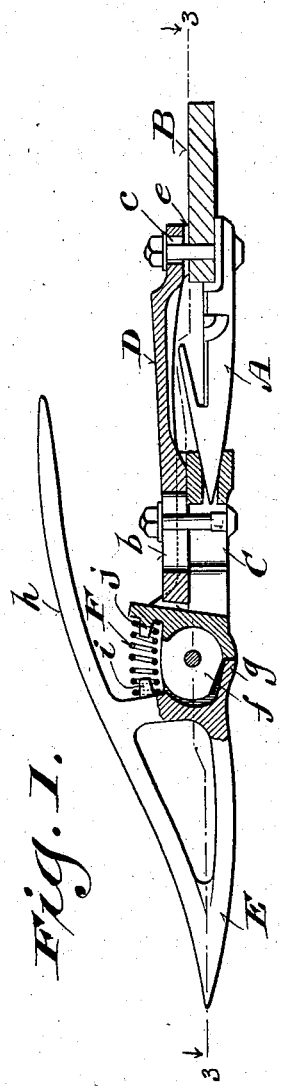
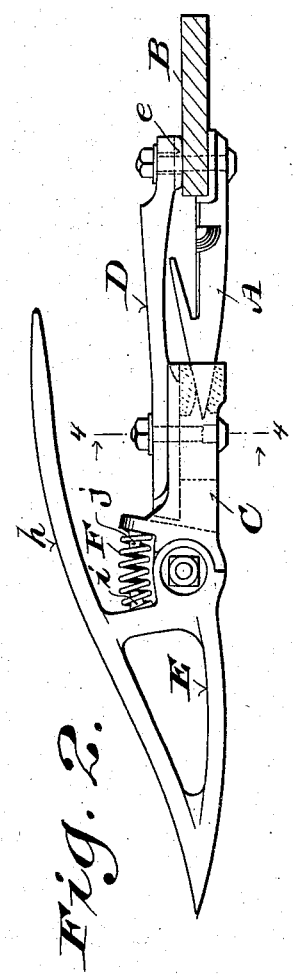
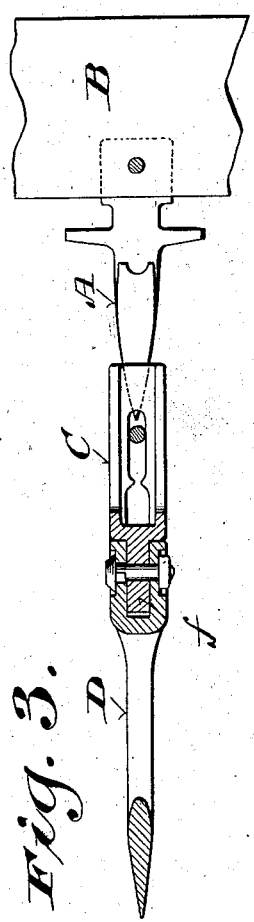
Witnesses:
Geo. W. Young.
N. E. Oliphant
Inventor:
Louis Franzmeier
By H. G. Underwood
Attorneys No. 728,561.

Patented May 19, 1903.

UNITED STATES PATENT OFFICE.

LOUIS FRANZMEIER, OF NEWTON, WISCONSIN.

HARVESTER ATTACHMENT.

SPECIFICATION forming part of Letters Patent No. 728,561, dated May 19, 1903.

Application filed November 12, 1902. Serial No. 130,954. (No model.)

*To all whom it may concern:*

Be it known that I, LOUIS FRANZMEIER, a citizen of the United States, and a resident of Newton, in the county of Manitowoc and State of Wisconsin, have invented certain new and useful Improvements in Harvester Attachments; and I do hereby declare that the following is a full, clear, and exact description thereof.

The improvements consist in certain peculiarities of construction and combination of parts hereinafter particularly set forth with reference to the accompanying drawings and subsequently claimed, the object of the invention being to provide simple, economical, and durable attachments readily applicable to knife-guard fingers and finger-bars of harvesters, regardless of the length of such fingers, to serve as means for raising lodged grain or other material to be cut.

Figure 1 of the drawings represents a partly-vertical longitudinal section view of an attachment in accordance with my invention connected to a knife-guard finger and finger-bar of a harvester; Fig. 2, a side elevation of the same; Fig. 3, a plan view, partly in section, as indicated by line 3 3 in the first figure; Fig. 4, a transverse sectional view indicated by line 4 4 in the second figure; and Fig. 5, a detail plan view of an inverted stay-plate, the same being a part of said attachment.

Referring by letter to the drawings, A indicates a knife-guard finger, and B the finger-bar, of a harvester. Engaged by the point of the knife-guard finger is the rear socket end of a shank C, constituting part of the attachment herein set forth, this shank being preferably longitudinally slotted forward of the socket therein. Bolted with the knife-guard finger to the finger-bar is a stay-plate D, that overlaps the shank C, to which it is also bolted. The bolt-apertures $b$ $c$ in the stay-plate are both slots longitudinally of said plate in order to provide for adjustment in connecting the aforesaid shank to knife-guard fingers of variable length. The forward portion of the stay-plate is preferably shaped to form an under side central tongue $d$, that seats in the upper portion of the shank C, the latter being recessed to receive said tongue, and the rear end of said plate is preferably provided with under side ledges $e$, that bear upon the finger-bar.

In rule-joint connection with the forward portion of shank C is a runner E, the under face of the shank-tongue $f$ and the opposing portion $g$ of the runner in the joint being of partly-angular contour, as shown in Fig. 1, to limit upward movement of said runner. Under its rearwardly-extending arm $h$ the runner is provided with a lug $i$, engaging one end of a spiral spring F, the other end of which is engaged by a lug $j$ of an upwardly-extending portion of the joint end of the shank C, said spring being under tension and arranged to resist upward movement on the part of said runner. In practice the runner is in advance of the cutting apparatus, and said runner has limited upward yield to obstructions of more than ordinary resistance in its path.

The attachment as a whole is herein shown on a short knife-guard finger; but were it on one of greater length the stay-plate D would be farther back on shank C, the finger-bar bolt being central or otherwise in the rear slot $c$ of said plate.

Having thus described my invention, what I claim as new, and desire to secure by Letters Patent, is—

1. An attachment consisting of a shank having a socket end for engagement by the point of a knife-guard finger of a harvester, a stay-plate for connection with said finger to the finger-bar of the harvester to overlap the shank to which it is fastened, a runner in rule-joint connection with said shank, and a spring arranged under tension between the runner and aforesaid shank to resist yield in the joint.

2. An attachment consisting of a shank having a socket end for engagement by the point of a knife-guard finger of a harvester, a stay-plate for connection with said finger to the finger-bar of the harvester and provided with a longitudinal slot in its forward portion that overlaps the shank to which it is bolted, the bolt being extended through the plate-slot, a runner in rule-joint connection with said shank, and a spring arranged under tension between the runner and aforesaid shank to resist yield in the joint.

3. An attachment consisting of a shank having a socket end for engagement by the point of a knife-guard finger of a harvester, a stay-plate for connection with said finger to the finger-bar of the harvester and provided with a forward under side tongue having fit in the shank to which it is bolted, the bolt being extended through a longitudinal slot in the tongue portion of the plate, a runner in rule-joint connection with said shank, and a spring arranged under tension between the runner and aforesaid shank to resist yield in the joint.

4. An attachment consisting of a shank having a socket end for engagement by the point of a knife-guard finger of a harvester, a stay-plate for connection with said finger to the finger-bar of the harvester to overlap the shank to which it is fastened, a runner in rule-joint connection with said shank, the shank-tongue and opposing portion of the runner in the joint being of partly-angular contour to limit upward movement of said runner, and a spring under tension between the aforesaid shank and runner to resist yield in said joint.

5. An attachment consisting of a shank having a socket end for engagement by the point of a knife-guard finger of a harvester, a stay-plate for connection with said finger to the finger-bar of the harvester to overlap the shank to which it is bolted, the bolt-apertures in the plate and shank being longitudinal slots, a runner in rule-joint connection with said shank, and a spring under tension between the runner and aforesaid shank to resist yield in the joint.

In testimony that I claim the foregoing I have hereunto set my hand, at Timothy, in the county of Manitowoc and State of Wisconsin, in the presence of two witnesses.

LOUIS FRANZMEIER.

Witnesses:
H. A. MUELLER,
P. J. MCMAHON.